United States Patent
Lin (10) Patent No.: US 11,653,351 B2
(45) Date of Patent: May 16, 2023

(54) WIRELESS COMMUNICATION METHOD AND DEVICE

(71) Applicant: GUANGDONG OPPO MOBILE TELECOMMUNICATIONS CORP., LTD., Guangdong (CN)

(72) Inventor: Yanan Lin, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 0 days.

(21) Appl. No.: 16/992,237

(22) Filed: Aug. 13, 2020

(65) Prior Publication Data

US 2020/0374905 A1 Nov. 26, 2020

Related U.S. Application Data

(63) Continuation of application No. PCT/CN2018/076769, filed on Feb. 13, 2018.

(51) Int. Cl.
*H04W 72/12* (2009.01)
*H04W 72/1268* (2023.01)
(Continued)

(52) U.S. Cl.
CPC ... *H04W 72/1268* (2013.01); *H04W 72/0446* (2013.01); *H04W 72/1247* (2013.01); *H04W 72/1257* (2013.01); *H04W 80/08* (2013.01)

(58) Field of Classification Search
CPC ......... H04W 74/0833; H04W 56/0005; H04W 52/146; H04W 72/0413; H04W 52/281; H04W 72/1278
See application file for complete search history.

(56) References Cited

U.S. PATENT DOCUMENTS

2009/0201861 A1   8/2009   Kotecha
2012/0172063 A1*  7/2012   Lee ..................... H04W 74/006
                                                  455/458
(Continued)

FOREIGN PATENT DOCUMENTS

CN   101043730 A   9/2007
CN   102547999 A   7/2012
(Continued)

OTHER PUBLICATIONS

VIVO: "Multiplexing data with different transmission durations", 3GPP Draft: R1-1800205 Multiplexing Data A/ITH Different Transmission Durations, vol. RAN WG1, No. Vancouver, Canada;Jan. 22, 2018-Jan. 26, 2018 Jan. 13, 2018 (Jan. 13, 2018), XP051384694 (Year: 2018).*

(Continued)

*Primary Examiner* — Romani Ohri
(74) *Attorney, Agent, or Firm* — Perkins Coie LLP (57) ABSTRACT

Provided in an embodiment of the present invention are a wireless communication method and device capable of preventing a more important uplink transmission (e.g. a URLLC service) from being affected by an ongoing uplink transmission (e.g. an eMBB service). The method comprises: a terminal receiving a first message, the first message instructing the terminal to stop an uplink transmission; and the terminal stopping the uplink transmission in response to the first terminal.

20 Claims, 5 Drawing Sheets

(51) Int. Cl.
*H04W 72/0446* (2023.01)
*H04W 80/08* (2009.01)

(56) References Cited

U.S. PATENT DOCUMENTS

| | | | |
|---|---|---|---|
| 2014/0192798 | A1 | 7/2014 | Yang |
| 2015/0045035 | A1 | 2/2015 | Nigam et al. |
| 2016/0269963 | A1 | 9/2016 | Nigam et al. |
| 2016/0278083 | A1* | 9/2016 | Dinan ............... H04W 52/0219 |
| 2017/0149552 | A1* | 5/2017 | Vejlgaard ............ H04L 5/0048 |
| 2017/0195113 | A1* | 7/2017 | Smaini ................ H04L 27/00 |
| 2017/0280441 | A1* | 9/2017 | Shimezawa ....... H04W 72/0446 |
| 2018/0035459 | A1* | 2/2018 | Islam ................ H04L 5/0053 |
| 2018/0042030 | A1* | 2/2018 | Xu ................. H04W 28/0236 |
| 2019/0268938 | A1* | 8/2019 | Zhao ................. H04L 5/0048 |
| 2020/0205140 | A1* | 6/2020 | Du ..................... H04W 72/04 |
| 2020/0288482 | A1* | 9/2020 | Yi ................... H04W 72/1278 |
| 2020/0336249 | A1* | 10/2020 | Yi ..................... H04L 5/00 |

FOREIGN PATENT DOCUMENTS

| | | |
|---|---|---|
| CN | 102932837 A | 2/2013 |
| CN | 103260246 A | 8/2013 |
| CN | 104144506 A | 11/2014 |
| CN | 107666715 A | 2/2018 |
| RU | 2556387 C2 | 7/2015 |
| WO | 2013120405 A1 | 8/2013 |
| WO | 2014051341 A1 | 4/2014 |
| WO | 2017194822 A1 | 11/2017 |
| WO | 2017209570 A1 | 12/2017 |
| WO | 2018017802 A1 | 1/2018 |
| WO | 2018026165 A1 | 2/2018 |

OTHER PUBLICATIONS

International Search Report in the international application No. PCT/CN2018/076769, dated Jul. 27, 2018.
Written Opinion of the International Search Authority in the international application No. PCT/CN2018/076769, dated Jul. 27, 2018.
3GPP TS 38.213 V1.0.0 (Sep. 2017), 3rd Generation Partnership Project; Technical Specification Group Radio Access Network; NR; Physical layer procedures for control (Release 15).
VIVO: "Multiplexing data with different transmission durations", 3GPP Draft: R1-1800205 Multiplexing Data With Different Transmission Durations, vol. RAN WG1, No. Vancouver, Canada;Jan. 22, 2018-Jan. 26, 2018 Jan. 13, 2018 (Jan. 13, 2018), XP051384694, Retrieved from the Internet: URL: http://www.3gpp.org/ftp/tsg%5Fran/WG1%5FRL1/TSGR1 %5FAH/NR%5FAH%5F1801/Docs/ [retrieved on Jan. 13, 2018].
Supplementary European Search Report in the European application No. 18906228.4, dated Dec. 11, 2020.
First Office Action of the Russian application No. 2020129772, dated Apr. 13, 2021.
3GPP TSG RAN WG1 Meeting AH 1801 R1-1800204, Vancouver, Canada, Jan. 22-26, 2018; Source: vivo; Title: Remaining issues on UL data transmission procedure.
First Office Action of the European application No. 18906228.4, dated Jun. 28, 2021.
Office Action of the Indian application No. 202027037193, dated Nov. 29, 2021. 6 pages with English translation.
3GPP TSG RAN WG1 NR Ad-Hoc#2 R1-1710383, Qingdao, P.R. China Jun. 27-30, 2017; Source: vivo; Title: Discussion on UL multiplexing data with different transmission durations. 3 pages.
3GPP TSG-RAN WG1 #88 R1-1701870, Athens, Greece, Feb. 13-17, 2017; Agenda Item: 8.1.3.4.2; Source: Ericsson; Title: On eMBB/URLLC multiplexing for uplink. 2 pages.
3GPP TSG RAN1 WG Meeting #88 R1-1702241, Athens, Greece Feb. 13-17, 2017; Source: Intel Corporation; Title: Uplink multiplexing of eMBB/URLLC transmissions. 8 pages.
First Office Action of the Chinese application No. 202011009784.6, dated Sep. 22, 2021. 37 pages with English translation.
First Written Opinion of the Singaporean application No. 11202007762X, dated May 6, 2022. 11 pages.
First Office Action of the Japanese application No. 2020-564985, dated Mar. 4, 2022. 15 pages with English translation.
Intel Corporation, "Multiplexing of UL transmissions with different data durations and latency requirements", 3GPP TSG RAN WG1 Meeting#89 R1-1707415, Gangzhou, P.R. China; May 15-19, 2017. 7 pages.
Second Office Action of the Chinese application No. 202011009784.6, dated Dec. 20, 2021. 18 pages with English translation.
Second Office Action of the European application No. 18906228.4, dated Dec. 21, 2021. 5 pages.
Vivo, "Remaining issues on multiplexing data with different transmission durations", 3GPP TSG RAN WG1 Meeting 91 R1-1719798 Reno, USA, Nov. 27-Dec. 1, 2017. 11 pages.
First Office Action of the Korean application No. 10-2020-7026162, dated Nov. 29, 2022. 9 pages with English translation.

* cited by examiner

WIRELESS COMMUNICATION METHOD AND DEVICE

CROSS REFERENCE TO RELATED APPLICATION

This application is a continuation of International Patent Application No. PCT/CN2018/076769 filed on Feb. 13, 2018, the disclosure of which is hereby incorporated by reference in its entirety.

BACKGROUND

There was introduced in the present into present 5th-Generation (5G) system a Ultra-Reliable Low Latency Communication (URLLC), which realizes ultra-reliable (for example, 99.999%) transmission in an extremely low latency (for example, 1 ms). For achieving this purpose, a preemption mechanism is introduced to Downlink (DL) transmission, namely a URLLC service is inserted during transmission of an Enhance Mobile Broadband (eMBB) service.

How to avoid influence of an eMBB service under execution on a URLLC service in Uplink (UL) transmission is a problem urgent to be solved.

SUMMARY

The application relates to the field of communication, and more particularly to a wireless communication method and device.

Embodiments of the application provide a wireless communication method and device, which may avoid influence of UL transmission (for example, an eMBB service) under execution on more important UL transmission (for example, a URLLC service).

A first aspect of the present disclosure provides a wireless communication method, which may include the following operations. A terminal receives a first message, the first message being used to instruct the terminal to stop UL transmission. The terminal determines that the UL transmission can be stopped, based on at least one of the following: a type of the UL transmission, a resource indication type of the UL transmission, a Transmission Time Interval (TTI) of the UL transmission, a format of scheduling signaling for the UL transmission, a search space where the scheduling signaling is located, or receiving time at which the first message and the scheduling signaling for the UL transmission are received respectively. The terminal stops the UL transmission responsive to the first message.

A second aspect of the present disclosure provides a terminal, which may include a transceiver and a processor. The transceiver is configured to receive a first message, the first message being used to instruct the UL transmission. The processor is configured to: determine that the UL transmission can be stopped, based on at least one of the following: a type of the UL transmission, a resource indication type of the UL transmission, a TTI of the UL transmission, a format of scheduling signaling for the UL transmission, a search space where the scheduling signaling is located, or receiving time at which the first message and the scheduling signaling for the UL transmission are received respectively; and stop the UL transmission responsive to the first message.

According to the embodiments of the application, the network device transmits the first message used to instruct stopping of the UL transmission to the terminal, and the terminal stops the UL transmission in response to the first message, so that influence of one UL transmission being executed on another UL transmission to be executed may be avoided, for example, influence of an eMBB service on a URLLC service is avoided, and a signaling overhead may be reduced, and complexity of the terminal is reduced.

BRIEF DESCRIPTION OF THE DRAWINGS

In order to describe the technical solutions of the embodiments of the application more clearly, the drawings required to be used in descriptions about the embodiments or a conventional art will be simply introduced below. It is apparent that the drawings described below are only some embodiments of the application. Other drawings may further be obtained by those of ordinary skill in the art according to these drawings without creative work.

DETAILED DESCRIPTION

The technical solutions in the embodiments of the application will be described below in combination with the drawings in the embodiments of the application. It is apparent that the described embodiments are not all embodiments but part of embodiments of the application. All other embodiments obtained by those of ordinary skill in the art based on the embodiments in the application without creative work shall fall within the scope of protection of the application.

The technical solutions of the embodiments of the application may be applied to various communication systems, for example, a Global System of Mobile Communication (GSM), a Code Division Multiple Access (CDMA) system, a Wideband Code Division Multiple Access (WCDMA)

system, a General Packet Radio Service (GPRS), a Long Term Evolution (LTE) system, an LTE Frequency Division Duplex (FDD) system, LTE Time Division Duplex (TDD), a Universal Mobile Telecommunication System (UMTS), a Worldwide Interoperability for Microwave Access (WiMAX) communication system or a future 5G system (which may also be called a New Radio (NR) system).

Figure 1:
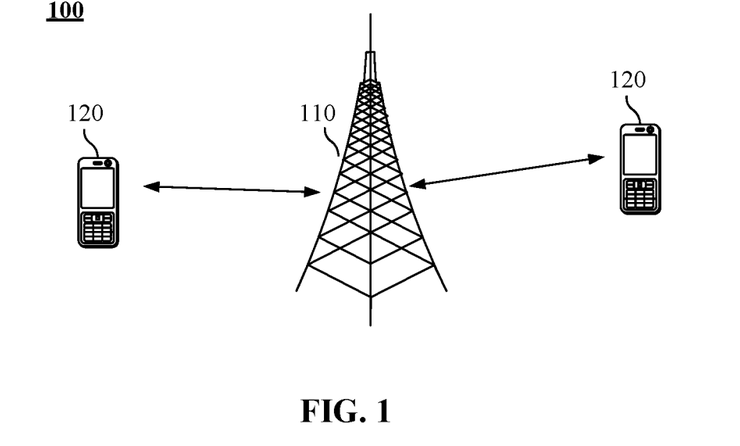
FIG. 1 is a schematic diagram of a wireless communication system according to an embodiment of the application.

FIG. 1 illustrates a wireless communication system 100 to which the embodiments of the application are applied. The wireless communication system 100 may include a network device 110. The network device 110 may be a device communicating with a terminal device. The network device 110 may provide communication coverage for a specific geographical region and may communicate with a terminal device (for example, User Equipment (UE)) in the coverage. Optionally, the network device 110 may be a Base Transceiver Station (BTS) in the GSM or the CDMA system, may also be a NodeB (NB) in the WCDMA system, and may further be an Evolutional Node B (eNB or eNodeB) in the LTE system or a wireless controller in a Cloud Radio Access Network (CRAN). Or the network device may be a relay station, an access point, a vehicle device, a wearable device, a network-side device in a future 5G network, a network device in a future evolved Public Land Mobile Network (PLMN) or the like.

The wireless communication system 100 further includes at least one terminal device 120 within the coverage of the network device 110. The terminal device 120 may be mobile or fixed. Optionally, the terminal device 120 may refer to an access terminal, UE, a user unit, a user station, a mobile station, a mobile radio station, a remote station, a remote terminal, a mobile device, a user terminal, a terminal, a wireless communication device, a user agent or a user device. The access terminal may be a cell phone, a cordless phone, a Session Initiation Protocol (SIP) phone, a Wireless Local Loop (WLL) station, a Personal Digital Assistant (PDA), a handheld device with a wireless communication function, a computing device, another processing device connected to a wireless modem, a vehicle device, a wearable device, a terminal device in the future 5G network, a terminal device in the future evolved PLMN or the like.

Optionally, the terminal devices 120 may perform Device to Device (D2D) communication with each other.

Optionally, the 5G system or network may also be called an NR system or network.

One network device and two terminal devices are exemplarily shown in FIG. 1. Optionally, the wireless communication system 100 may include multiple network devices and another number of terminal devices may be included in coverage of each network device. There are no limits made thereto in the embodiments of the application.

Optionally, the wireless communication system 100 may further include another network entity such as a network controller and a mobility management entity. There are no limits made thereto in the embodiments of the application.

It is to be understood that terms "system" and "network" in the disclosure may usually be exchanged in the disclosure. In the disclosure, term "and/or" is only an association relationship describing associated objects and represents that three relationships may exist. For example, A and/or B may represent three conditions: i.e., independent existence of A, existence of both A and B and independent existence of B. In addition, character "/" in the disclosure usually represents that previous and next associated objects form an "or" relationship.

Figure 2:
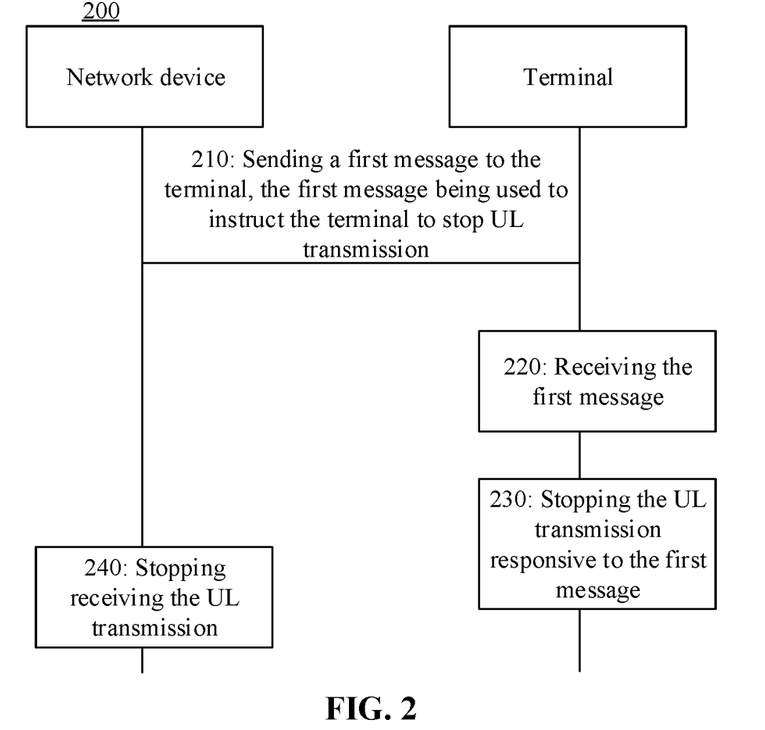
FIG. 2 is a schematic flowchart of a wireless communication method according to an embodiment of the application.

FIG. 2 is a schematic flowchart of a wireless communication method 200 according to an embodiment of the application. The method 200 may optionally be applied, but not limited, to the system shown in FIG. 1. As shown in FIG. 2, the method 200 includes at least part of the following operations 210 to 240.

In 210, a network device sends a first message to a terminal, the first message being used to instruct the terminal to stop UL transmission. The first message is optionally physical-layer signaling.

For example, when an UL transmission is to be executed on a certain block of resource and the network device needs to schedule the terminal device to perform another UL transmission, if a priority of the other UL transmission is higher than that of the UL transmission, the first message is sent to the terminal, the first message being used to instruct the terminal to stop the UL transmission.

Optionally, a type of the UL transmission as mentioned above may be a service type, for example, may be divided into a URLLC service and an eMBB service. Or, the type of the UL transmission may be divided according to transmitted data or signaling, and may be divided into UL transmission for transmitting data and UL transmission for transmitting control signaling.

Optionally, under the condition that the first message is sent to the terminal, the network device may determine that the UL transmission can be stopped according to the type of the UL transmission, a resource indication type of the UL transmission, a TTI of the UL transmission, a format of scheduling signaling for the UL transmission and/or a search space where the scheduling signal is located.

Optionally, the abovementioned resource indication type may be a slot resource indication type and may specifically be divided according to a scheduling granularity of a slot resource. Specifically, it may be divided into a resource indication for scheduling more symbols (for example, it may be a type A, a slot-scheduling-based resource indication) and a resource indication for scheduling fewer symbols (for example, it may be a type B, a non-slot scheduling-based resource indication).

Optionally, a type of the scheduling signaling for the UL transmission may be distinguished by the format of the scheduling signaling and, for example, may be distinguished as a compressed scheduling signaling format and a conventional scheduling signaling format. Or, the type of the scheduling signaling for the UL transmission may be distinguished by the search space where the scheduling signaling is located and, for example, may be distinguished as scheduling signaling in a high-density search space and scheduling signaling in a low-density search space.

Optionally, whether to stop the UL transmission is determined according to the search space where the scheduling signaling is located, which may include: determining whether to stop the UL transmission based on a density of the search space, and may also include determining whether to stop the UL transmission according to a serial number or index or the like of the search space. For example, if an index of the scheduling signaling is 1, the UL transmission may be stopped, and if the index of the scheduling signaling is 2, the UL transmission cannot be stopped.

A priority sequence of the UL transmission may be as follows:

priority of UL transmission of control information>priority of UL transmission of data; or priority of UL transmission of the URLLC service>priority of UL transmission of the eMBB service; or priority of UL transmission of URLLC data>priority of UL transmission of URLLC Uplink Control Information (UCI)>priority of UL transmission of eMBB UCI>priority of UL transmission of eMBB data; or priority of UL transmission of the URLLC UCI>priority of UL transmission of the URLLC data>priority of UL transmission of the eMBB UCI>priority of UL transmission of the eMBB data; or priority of UL transmission corresponding to the type B>priority of UL transmission of the type A; or priority of UL transmission corresponding to a short TTI>priority of UL transmission corresponding to a long TTI; or priority of UL transmission for which scheduling signaling is in the compressed scheduling signaling format>priority of UL transmission for which scheduling signaling is in the conventional scheduling signaling format; or priority of UL transmission for which scheduling signaling is in a high-density search space>priority of UL transmission for which the scheduling signaling is in a low-density search space.

Based on the priority sequence, a network side may determine whether to send the first message and determine, under the condition that the first message is sent, whether to stop receiving the UL transmission.

Optionally, when another terminal is needed to perform UL transmission on a resource (for example, a time-domain resource, or a frequency-domain resource or a time-frequency resource) for the UL transmission, the network device sends the first message to the terminal.

Specifically, since the other terminal performs UL transmission with a relatively high priority on the resource for the UL transmission, for avoiding interference to the UL transmission of the other terminal, UL transmission of at least one terminal using the same resource with the other terminal may be stopped.

Optionally, the network device, when performing UL scheduling for the terminal, may select the format of the scheduling signaling and/or the search space for transmission of the scheduling signaling according to a priority of UL transmission in UL scheduling.

For example, if the priority of the UL transmission is relatively high, the scheduling signaling in the compressed scheduling signaling format may be selected, or otherwise the scheduling signaling in the conventional scheduling signaling format is selected.

For example, if the priority of the UL transmission is relatively high, the scheduling signaling for the UL transmission may be transmitted in a specific search space or a high-density search space may be selected to transmit the scheduling signaling, or otherwise a low-density search space is selected to transmit the scheduling signaling.

In 220, the terminal receives the first message, the first message being used to instruct the terminal to stop the UL transmission.

Optionally, the first message is group common DCI or UL grant signaling.

When a UL grant is used as the first message, a special Modulation and Coding Scheme (MCS) level may be set to instruct stopping of the UL transmission. Or, a field of a frequency domain resource assignment and/or time domain resource assignment may be set to be 0.

In 230, the terminal stops the UL transmission responsive to the first message.

Optionally, the terminal, after receiving the first message, may determine whether to stop the UL transmission.

Optionally, the terminal may determine whether to stop the UL transmission based on the type of the UL transmission, the resource indication type of the UL transmission, the TTI of the UL transmission, the format of the scheduling signaling for the UL transmission, the search space where the scheduling signaling is located; and/or receiving time at which the first message and the scheduling signaling for the UL transmission are received respectively.

Optionally, the terminal may determine whether to stop the UL transmission according to the search space where the scheduling signaling is located, which may include determining whether to stop the UL transmission based on the density of the search space, and may also include determining whether to stop the UL transmission according to the serial number or index or the like of the search space. For example, if the index of the scheduling signaling is 1, the UL transmission may be stopped, and if the index of the scheduling signaling is 2, the UL transmission cannot be stopped.

In an implementation mode, if the UL transmission is used to transmit the URLLC service, the UL transmission cannot be stopped, and if the UL transmission is used to transmit the eMBB service, the UL transmission can be stopped.

In an implementation mode, if the UL transmission is UL transmission for the URLLC service or the URLLC UCI, the UL transmission is not stopped, or otherwise the UL transmission is stopped.

In an implementation mode, if the UL transmission is UL transmission corresponding to the type B, the UL transmission is not stopped, and if the UL transmission is UL transmission corresponding to the type A, the UL transmission is stopped.

In an implementation mode, if TTI of the UL transmission is less than or equal to a specific value, the UL transmission is not stopped, or otherwise the UL transmission is stopped.

In an implementation mode, if the scheduling signaling for the UL transmission is in a high-density search space, the UL transmission is not stopped, and if it is in a low-density search space, the UL transmission is stopped.

In an implementation mode, if the scheduling signaling for the UL transmission is in a search space 1, the UL transmission is not stopped, and if it is in a search space 2, the UL transmission is stopped. The search spaces 1 and 2 are predetermined through a protocol or configured through high-layer signaling.

In an implementation mode, if the signaling format of the scheduling signaling for the UL transmission is the compressed scheduling signaling format, the UL transmission is not stopped, and if the signaling format of the scheduling signaling for the UL transmission is the conventional scheduling signaling format, the UL transmission is stopped.

Optionally, the terminal may determine whether to stop the UL transmission according to the receiving time at which the first message and the scheduling signaling for the UL transmission are received respectively.

For example, if the first message is received earlier than the scheduling signaling for the UL transmission, the UL transmission cannot be stopped, and if the first message is received after the scheduling signaling for the UL transmission, the UL transmission can be stopped.

Optionally, the terminal may determine whether to stop the UL transmission according to a priority sequence of the UL transmission. The priority sequence of the UL transmission is a sequence formed based on the type of the UL transmission, the resource indication type of the UL transmission, the TTI of the UL transmission, the search space where the scheduling signaling for the UL transmission is located and/or the format of the scheduling signaling, etc.

A reason for stopping the UL transmission may be known to the terminal. For example, a specific type of other UL transmission that triggers stopping of the UL transmission may be indicated in the first message, and thus the terminal may compare a priority of the other UL transmission with that of the UL transmission instructed to be stopped. If the priority of the UL transmission instructed to be stopped is higher than that of the other UL transmission, the terminal may not stop the UL transmission, and if the priority of the UL transmission instructed to be stopped is lower than that of the other UL transmission, the terminal may stop the UL transmission.

Or, the reason for stopping the UL transmission may be unknown to the terminal. In such case, the terminal may determine the priority sequence of the UL transmission among multiple UL transmissions, and determine whether to stop the UL transmission based on the determined priority sequence. For example, if the priority of the UL transmission is the lowest in all the multiple UL transmissions, the UL transmission is stopped, or otherwise the UL transmission is not stopped.

A specific prioritization manner is referred to the above descriptions and will not be elaborated herein for simplicity.

Optionally, the first message is further used to indicate a start end of stopping the UL transmission.

The first message may indicate a slot index and/or symbol index of the start point of the UL transmission.

In such case, the terminal may directly stop the UL transmission on a slot and/or symbol indicated by the slot index and/or the symbol index.

Optionally, the first message indicates the start point by indicating a timing relationship between the message and the start point.

Specifically, the first message may indicate the specific slot and/or symbol where the UL transmission is started to be stopped from the first message, so that the terminal, after receiving the first message, stops the UL transmission according to the instruction of the first message.

Figure 3:
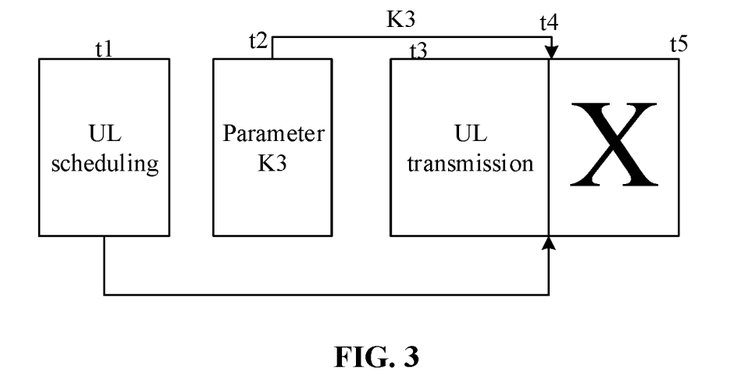
FIG. 3 is a schematic diagram of a time position where UL transmission is stopped according to an embodiment of the application.

For example, as shown in FIG. 3, the network device performs scheduling of UL transmission for the terminal at time t1, the scheduled UL transmission starts from t3 and ends at t5. The network device sends the first message to the terminal at time t2, where the first message may carry a parameter K3, K3 indicating a timing relationship between the first message and the start point of stopping the UL transmission. Therefore, it may be obtained that the UL transmission can be stopped at time t4 through the timing relationship.

Optionally, the network device may determine the timing relationship according to the start point of the UL transmission.

Figure 4:
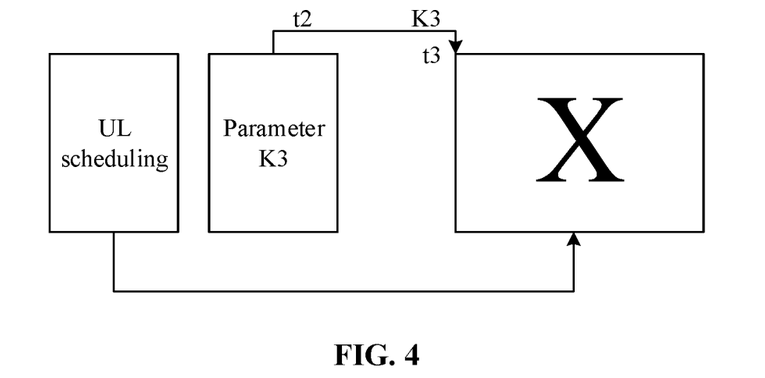
FIG. 4 is a schematic diagram of a time position where UL transmission is stopped according to an embodiment of the application.
Figure 5:
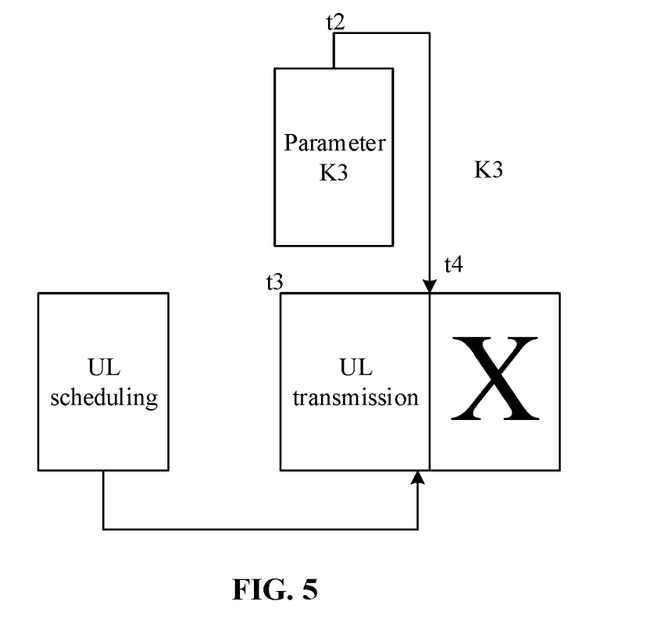
FIG. 5 is a schematic diagram of a time position where UL transmission is stopped according to an embodiment of the application.

For example, as shown in FIG. 4, if the UL transmission has yet not started when the first message is sent (sending position t2 of the parameter K3), it is determined that the stopped UL transmission may be a complete UL transmission, and the network may determine the timing relationship according to the start point (t3) of the UL transmission, namely instructing the terminal to stop the UL transmission at t3. As shown in FIG. 5, if the UL transmission (where a starting point is at t3) has started when the first message is sent (where the sending position of the parameter K3 is at t2), the start point of the stopped UL transmission may be a middle position (at t4) of the UL transmission.

It is to be understood that, in the examples shown in FIG. 4 and FIG. 5 or similar examples, the network device may also directly carry in the first message a moment (for example, a slot and/or an index corresponding to t3 in FIG. 4, a slot and/or index corresponding to t4 in FIG. 5) when the UL transmission is stopped according to the start point of the UL transmission.

Optionally, in the embodiment of the application, the first message may also not indicate the start point of stopping the UL transmission. For example, if the UL transmission has yet not started when the first message is received, the terminal stops a complete UL transmission, and if the UL transmission has started when the first message is received, the UL transmission may be stopped immediately when the first message is received.

Optionally, the timing relationship may be preset in the terminal.

Specifically, the timing relationship may be sent to the terminal through another message and preset in the terminal. For example, it may be sent to the terminal through high-layer signaling (for example, Radio Resource Control (RRC) signaling). Or, the timing relationship is specified in the protocol and may be directly preset in the terminal without signaling.

Optionally, under the condition that the timing relationship is preset in the terminal, the terminal may determine a detection position for the first message based on its own UL scheduling condition and the timing relationship, and perform detection at the detection position. If there is no corresponding UL transmission, detection of the first message is not needed, and if there is UL transmission, the first message may be detected. Therefore, the number of times for which the terminal detects the first message may be reduced, and a signaling overhead for the first message may be reduced.

For example, if the UL transmission is performed in a slot 2 and a slot 3 and the terminal knows the UL transmission should be stopped on which of the symbols of the time slot 2 and the time slot 3 when the UL transmission can be stopped, the terminal may obtain a sending position for the first message according to the start point where the UL transmission is stopped and the timing relationship, and detect the first message at the sending position to determine whether the UL transmission can be stopped.

Optionally, in the embodiment of the application, a set of timing relationships between the first message and the start point of stopping the UL transmission may also be preset in the terminal. The terminal determines multiple positions where blind detection is to be performed on the first message based on the preset set and its own UL scheduling condition, and detects the first message at the multiple positions. If a value carried in the first message in at least one position is consistent with a value corresponding to the timing relationship of the corresponding position where the first message is located, then the UL transmission can be stopped. Therefore, flexibility of the timing relationship between the first message and the start point is improved, and adaptation to various terminal capabilities and flexible subframe types is achieved.

For example, if the UL transmission is performed in the time slot 2 and the time slot 3 and the terminal knows the UL transmission should be stopped on which of the symbols of the time slot 2 and the time slot 3 when the UL transmission is to be stopped, the terminal may obtain multiple sending positions for the first message according to the start point of stopping the UL transmission and multiple timing relationships, detect the first message at the multiple sending positions. If a value of one or more detected first messages is consistent with a value corresponding to timing relationships of the corresponding positions thereof, then it is determined that the UL transmission can be stopped.

The purpose for determining whether the value in the first message is consistent with the value of the timing relationship of the corresponding position where the first message is located is for the following reason.

If there are multiple UL transmissions for the terminal, and the terminal determines, for each UL transmission, multiple sending positions of the first message corresponding to the UL transmission based on multiple timing relationships, a sending position of the first message corresponding to a UL transmission may overlap with a sending position of the first message corresponding to another UL transmission, and in such case, the terminal has to determine the specific UL transmission that the first message is based on according to the value in the first message.

Optionally, the terminal may determine an end point of stopping the UL transmission according to a time-domain resource for the UL transmission.

In an implementation mode, the end point of stopping the UL transmission is an ending boundary of a first slot for the UL transmission.

Figure 6:
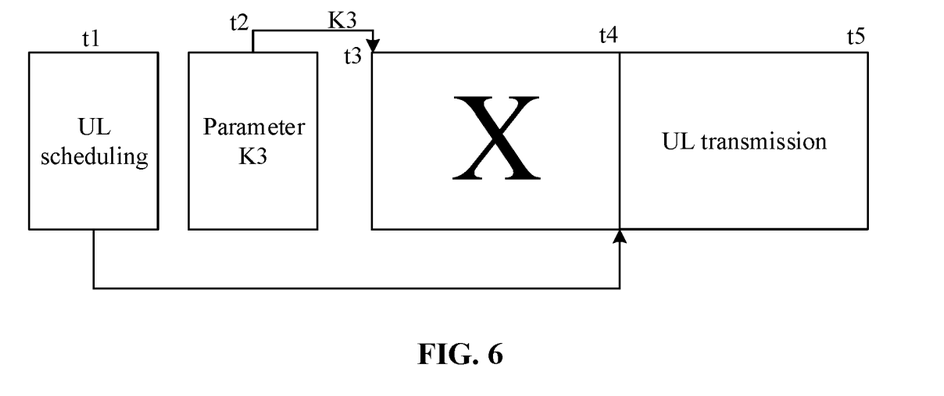
FIG. 6 is a schematic diagram of a time position where UL transmission is stopped according to an embodiment of the application.

For example, as shown in FIG. 6, the network device performs UL scheduling for the terminal at time t1, the scheduled UL transmission starts from t3 and ends at t5, the network device sends the first message to the terminal at time t2, the first message may contain the parameter K3, K3 indicating the timing relationship between the first message and the start point of stopping the UL transmission. Through the timing relationship, it may be obtained that the UL transmission can be stopped at the time t3 (i.e., the start point of the UL transmission). An ending point of the first slot for the UL transmission is at time t4, and in such case, the terminal may determine t4 as the end point of stopping UL transmission and start the UL transmission till the end t5 of the UL transmission.

In an implementation mode, the end point of stopping the UL transmission is an ending boundary of a first slot next to a receiving time of the first message in slots for the UL transmission.

In an implementation mode, the end point of stopping the UL transmission is an ending point of the time-domain resource for the UL transmission.

Figure 7:
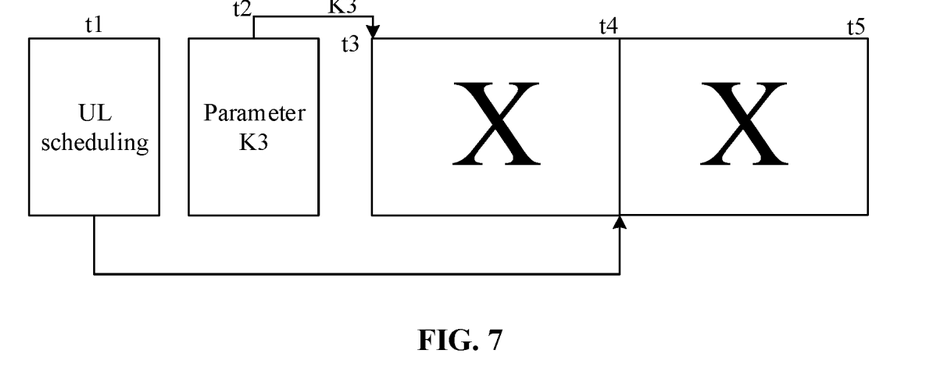
FIG. 7 is a schematic diagram of a time position where UL transmission is stopped according to an embodiment of the application.

For example, as shown in FIG. 7, the network device performs UL scheduling for the terminal at time t1, where the scheduled UL transmission starts from t3, the ending boundary of the first slot is at time t4, and the UL transmission ends at t5. The network device sends the first message to the terminal at time t2, and the first message may contain the parameter K3, K3 indicating a timing relationship between the first message and the start point of stopping the UL transmission. Through the timing relationship, it may be obtained that the UL transmission can be stopped at the time t3 (i.e., the start of the UL transmission). In addition, the terminal may determine the ending point t5 of the UL transmission as the end of stopping the UL transmission.

In an implementation mode, the end point of stopping the UL transmission is an ending boundary of a last slot for the UL transmission.

Optionally, a specific node, determined as the end point of stopping the UL transmission, of the time-domain resource for the UL transmission may be preset in the terminal, or may be indicated to the terminal through high-layer signaling, or may also be indicated to the terminal through the first message.

Optionally, the terminal determines the end point of stopping the UL transmission according to at least one of an effective duration of the first message, a maximum length of stopping the UL transmission, a minimum length of stopping the UL transmission or a stopping duration of present UL transmission.

Figure 8:
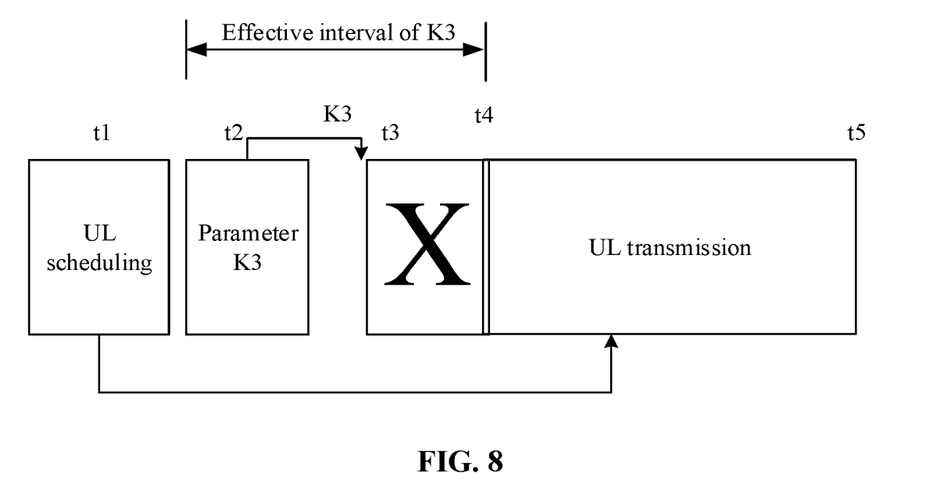
FIG. 8 is a schematic diagram of a time position where UL transmission is stopped according to an embodiment of the application.

For example, as shown in FIG. 8, the network device performs scheduling of UL transmission for the terminal at time t1, the scheduled UL transmission starts from t3 and ends at t5. The network device sends the first message to the terminal at time t2, where the first message may carry the parameter K3, K3 indicating a timing relationship between the first message and the start point of stopping the UL transmission, and based on the time sequence relationship, it may be obtained that the UL transmission can be stopped at the time t3 (i.e., the start point of the UL transmission). An ending point of an effective interval of the parameter K3 is at t4, and then t4 may be determined as the end of stopping the UL transmission.

Figure 9:
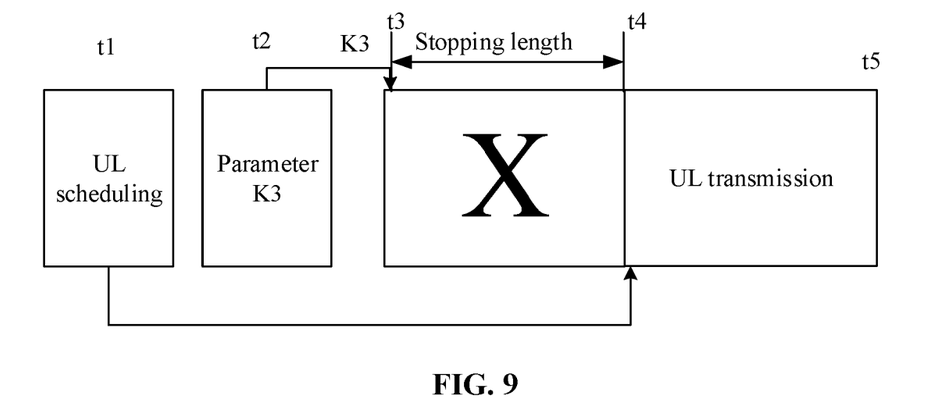
FIG. 9 is a schematic diagram of a time position where UL transmission is stopped according to an embodiment of the application.

For example, as shown in FIG. 9, the network device performs scheduling of UL transmission for the terminal at time t1, the scheduled UL transmission starts from t3 and ends at t5, the network device sends the first message to the terminal at time t2, the first message may contain the parameter K3, K3 indicating the timing relationship between the first message and the start point of stopping the UL transmission, and based on the timing relationship, it may be obtained that the UL transmission can be stopped at time t3 (i.e., the start of the UL transmission). An ending point corresponding to a stopping length of the UL transmission is at t4, and then t4 may be determined as the end point of stopping the UL transmission.

It is to be understood that, when the minimum length and another length (for example, the effective duration of the first message or the stopping duration of the present UL transmission) simultaneously exist, and if a stopping length corresponding to the another duration is less than the minimum length, the UL transmission is stopped according to the minimum length.

Or, when the maximum length and another length (for example, the effective duration of the first message or the stopping duration of the present UL transmission) simultaneously exist, and if the stopping length corresponding to the another duration is greater than the maximum length, the UL transmission is stopped according to the maximum length.

Optionally, the first message may indicate the end point of stopping the UL transmission.

For example, the first message may contain a slot index and/or symbol index of the end point of stopping the UL transmission, and the terminal may determine a slot and/or symbol indicated by the slot index and/or the symbol index as the end point of stopping the UL transmission.

Optionally, the first message indicates the end point through at least one of the following:

an effective duration of the first message, a maximum length of stopping the UL transmission, a minimum length of stopping the UL transmission or a stopping duration of the present UL transmission.

Optionally, the terminal may receive a second message that is not the first message, the second message indicating at least one of: the effective duration of the first message, the maximum length of stopping the UL transmission or the minimum length of stopping the UL transmission. Optionally, the second message is high-layer signaling.

Optionally, the first message indicates the start point and end point of stopping the UL transmission through the same information field. For example, the information field includes two bits, where a bit 00 represents that the start point of stopping the UL transmission is at time 1 and the end point is at time 2, and a bit 10 represents that the start point of stopping the UL transmission is at time 3 and the end point is at time 4.

In 240, the network device stops receiving the UL transmission.

Optionally, the network side may determine the start point of stopping the UL transmission according to a timing relationship, the timing relationship indicating a timing relationship between the first message and the start point.

Optionally, the network device may determine the end point of stopping the UL transmission based on the time-domain resource for the UL transmission.

Optionally, the network device may determine the end point of stopping the UL transmission according to at least one of the effective duration of the first message, the maximum length of stopping the UL transmission, the minimum length of stopping the UL transmission or the stopping duration of the present UL transmission.

Optionally, in the embodiment of the application, when a certain UL transmission can be stopped because of other UL transmission, the whole UL transmission may be stopped to avoid the condition that the UL transmission is continuously started and stopped (caused by many other UL transmissions) since the UL transmission occupies a relatively long time, thereby reducing power consumption of the terminal.

It is to be understood that, in the embodiment of the application, the first message indicates a time-domain position where the UL transmission is stopped and may also indicate a frequency-domain position where the UL transmission is stopped. For simplicity, there are no specific limits made thereto in the embodiment of the application.

According to the embodiment of the application, the network device transmits the first message used to instruct stopping of the UL transmission to the terminal, and the terminal stops the UL transmission in response to the first message, so that influence of one UL transmission being executed on another UL transmission to be executed may be avoided, for example, influence of the eMBB service on the URLLC service is avoided, and a signaling overhead may be reduced, and complexity of the terminal is reduced.

It is to be understood that, in the embodiment of the application, the method of the application or a similar method may also be adopted for DL transmission.

Specifically, the terminal receives a first message, the first message being used to indicate that there is no data to be received on at least one resource for scheduled DL transmission. Responsive to the first message, the terminal determines whether there is data to be received on the at least one resource based on a type of the DL transmission, a resource indication type of the DL transmission, a TTI of the DL transmission, a format of scheduling signaling for the DL transmission, a search space where the scheduling signaling is located and/or receiving time at which the first message and the scheduling signaling for the DL transmission are received respectively.

Optionally, whether there is data to be received on the at least one resource is determined according to the search space where the scheduling signaling is located, which may be implemented as follows. Whether there is data to be received on the at least one resource is determined based on a density of the search space, or whether there is data to be received on the at least one resource is determined according to a serial number or index, etc. of the search space. If an index of the scheduling signaling is 1, it may be determined that there is no data to be received on the at least one resource, and if the index of the scheduling signaling is 2, it may be determined that there is data to be received on the at least one resource.

In an implementation mode, if the DL transmission is used to transmit a URLLC service, it is determined that there is data to be received on the at least one resource, and if the DL transmission is used to transmit an eMBB service, it is determined that there is no data to be received on the at least one resource.

In an implementation mode, if the DL transmission is DL transmission for URLLC data or URLLC UCI, it is determined that there is data to be received on the at least one resource, or otherwise it is determined that there is no data to be received on the at least one resource.

In an implementation mode, if the DL transmission is DL transmission corresponding to type B, it is determined that there is data to be received on the at least one resource, and if the DL transmission is DL transmission corresponding to type A, it is determined that there is no data to be received on the at least one resource.

In an implementation mode, if a TTI of the DL transmission is less than or equal to a specific value, it is determined that there is data to be received on the at least one resource, or otherwise it is determined that there is no data to be received on the at least one resource.

In an implementation mode, if the scheduling signaling for the DL transmission is located in a high-density search space, it is determined that there is data to be received on the at least one resource, and if the scheduling signaling for the DL transmission is in a low-density search space, it is determined that there is no data to be received on the at least one resource.

In an implementation mode, if the scheduling signaling for the DL transmission is in a search space 1, it is determined that there is data to be received on the at least one resource, and if it is in a search space 2, it is determined that there is no data to be received on the at least one resource. The search spaces 1 and 2 are predetermined in a protocol or configured through high-layer signaling.

In an implementation mode, if a signaling format of the scheduling signaling for the DL transmission is a compressed scheduling signaling format, it is determined that there is data to be received on the at least one resource, and if the signaling format of the scheduling signaling for the DL transmission is a conventional scheduling signaling format, it is determined that there is no data to be received on the at least one resource.

Optionally, the terminal may determine whether to stop the DL transmission according to the receiving time at which the first message and the scheduling signaling for the DL transmission are received respectively.

For example, if the first message is received earlier than the scheduling signaling for the DL transmission, it is determined that there is data to be received on the at least one resource, and if the first message is received after the scheduling signaling for the DL transmission, it is determined that there is no data to be received on the at least one resource.

The operations of a terminal side for the DL transmission are described above, and operations of the network side for the DL transmission will be described below.

The network device sends the first message, the first message being used to indicate that there is no data to be received on at least one resource of scheduled DL transmission. The network device determines whether there is data to be received on the at least one resource based on the type of the DL transmission, the resource indication type of the DL transmission, the TTI of the DL transmission, the format of the scheduling signaling for the DL transmission and the search space where the scheduling signaling is located.

Optionally, when DL transmission for another terminal is to be performed on resources for DL transmission of the terminal, or other DL transmission for the terminal is to be performed on the resources (for example, a time-domain resource, or a frequency-domain resource or a time-frequency resource), the network device sends the first message to the terminal.

The network device may further determine whether to send the first message based on a priority of the DL transmission that needs to be interrupted. The priority may be determined based on a service type of the DL transmission.

Optionally, the abovementioned type of the DL transmission may be a service type and, for example, may be divided into the URLLC service and the eMBB service. Or, the type of the DL transmission may be divided according to transmitted data or signaling, and may be divided into DL transmission for transmitting data and DL transmission for transmitting control signaling.

Optionally, under the condition that the first message is sent, the network device may determine whether to send data on the at least one resource according to the type of the DL transmission, the resource indication type of the DL transmission, the TTI of the DL transmission, the format of the scheduling signaling for the DL transmission and/or the search space where the scheduling signal is located.

Optionally, the abovementioned resource indication type may be a slot resource indication type and may specifically be divided according to a slot resource scheduling granularity of a slot resource. Specifically, it may be divided into a resource indication for scheduling more symbols (for example, it may be type A and a slot-scheduling-based resource indication) and a resource indication for scheduling fewer symbols (for example, it may be type B and a non-slot scheduling-based resource indication).

Optionally, a type of the scheduling signaling for the DL transmission may be distinguished by the format of the scheduling signaling and, for example, may be distinguished as the compressed scheduling signaling format and the conventional scheduling signaling format. Or, the type of the scheduling signaling for the DL transmission may be distinguished by the search space where the scheduling signaling is located and, for example, may be distinguished as scheduling signaling in a high-density search space and scheduling signaling in a low-density search space.

Optionally, whether to send the data on the at least one resource is determined according to the search space where the scheduling signaling is located, which may be implemented as follows. Whether to send the data on the at least one resource is determined based on the density of the search space, or whether to send the data on the at least one resource is determined according to the serial number or index, etc. of the search space. If the index of the scheduling signaling is 1, the data may not be sent on the at least one resource, and if the index of the scheduling signaling is 2, the data may be determined to be sent on the at least one resource.

A priority sequence of the DL transmission may be as follows:

priority of DL transmission of control information>priority of DL transmission of data; or priority of DL transmission of the URLLC service>priority of DL transmission of the eMBB service; or priority of DL transmission of URLLC data>priority of DL transmission of URLLC DCI>DL transmission of eMBB DCI>DL transmission of eMBB data; or priority of DL transmission of the URLLC DCI>priority of DL transmission of the URLLC data>DL transmission of the eMBB DCI>DL transmission of the eMBB data; or priority of DL transmission corresponding to the type B>priority of DL transmission of the type A; or priority of DL transmission corresponding to a short TTI>priority of DL transmission corresponding to a long TTI; or priority of DL transmission for which scheduling signaling is in the compressed scheduling signaling format>priority of DL transmission for which scheduling signaling is in the conventional scheduling signaling format; or priority of DL transmission for which scheduling signaling is in a high-density search space>priority of DL transmission for which the scheduling signaling is in a low-density search space.

Based on the priority sequence, the network side may determine whether to send the first message and, under the condition that the first message is sent, determine whether to send the data on the at least one resource.

Optionally, the network device, when performing DL scheduling on the terminal, may select the format of the scheduling signaling and/or the search space for transmitting the scheduling signaling according to a priority of DL transmission involved in DL scheduling.

For example, if the priority of the DL transmission is relatively higher than other DL transmission, the compressed scheduling signaling format may be selected, or otherwise the conventional scheduling signaling format is selected.

For example, if the priority of the DL transmission is relatively higher than other DL transmission, the scheduling signaling for the DL transmission may be transmitted in a specific search space or a high-density search space may be selected to transmit the scheduling signaling, or otherwise a low-density search space may be selected to transmit the scheduling signaling.

Optionally, in the embodiment of the application, the first message may be called a preemption indication, and the scheduling signaling may be DL grant information.

Figure 10:
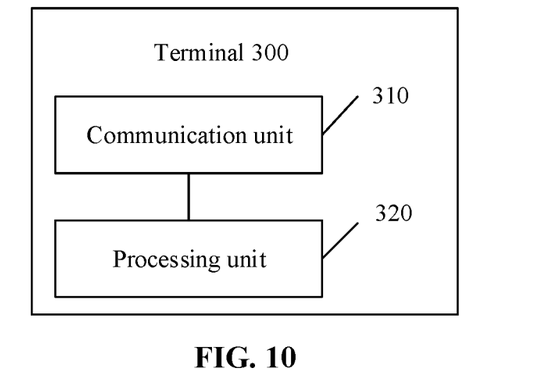
FIG. 10 is a schematic block diagram of a terminal according to an embodiment of the application.

FIG. 10 is a schematic block diagram of a terminal 300 according to an embodiment of the application. As shown in FIG. 10, the terminal 300 includes a communication unit 310 and a processing unit 320.

The communication unit 310 is configured to receive a first message, the first message being used to instruct the terminal to stop UL transmission.

The processing unit 320 is configured to stop the UL transmission responsive to the first message.

Optionally, the first message is further used to indicate a start point of stopping the UL transmission.

Optionally, the first message indicates the start point by indicating a timing relationship between the message and the start point.

Optionally, the processing unit 320 is further configured to:

determine the start point of stopping the UL transmission according to a timing relationship, the timing relationship indicating the timing relationship between the first message and the start point.

Optionally, the processing unit 320 is further configured to:

determine an end point of stopping the UL transmission based on a time-domain resource for the UL transmission.

Optionally, the end point of stopping the UL transmission includes:

an ending boundary of a first slot for the UL transmission; or, an ending boundary of a first slot after a receiving time of the first message in slots for the UL transmission; or, an ending point of the time-domain resource for the UL transmission; or, an ending boundary of a last slot for the UL transmission.

Optionally, the processing unit 320 is further configured to:

determine the end point of stopping the UL transmission according to at least one of: an effective duration of the first message, a maximum length of stopping the UL transmission, a minimum length of stopping the UL transmission or a stopping duration of present UL transmission.

Optionally, the first message is further used to indicate the end point of stopping the UL transmission.

Optionally, the first message indicates the end point through at least one of:

the effective duration of the first message, the maximum length of stopping the UL transmission, the minimum length of stopping the UL transmission or the stopping duration of the present UL transmission.

Optionally, the communication unit 310 is further configured to:

receive a second message that is not the first message, the second message indicating at least one of:

the effective duration of the first message, the maximum length of stopping the UL transmission or the minimum length of stopping the UL transmission.

The processing unit 320 is further configured to:

determine the end point of stopping the UL transmission based on the second message.

Optionally, the first message indicates the start point and end point of stopping the UL transmission through the same information field.

Optionally, the processing unit is further configured to determine that the UL transmission can be stopped, based on a type of the UL transmission, a resource indication type of the UL transmission, a TTI of the UL transmission, a format of scheduling signaling for the UL transmission, a density of a search space where the scheduling signaling is located and/or receiving time at which the first message and the scheduling signaling for the UL transmission are received respectively.

It is to be understood that the terminal 300 may correspond to the terminal in the method embodiment and may implement corresponding operations of the terminal in the method embodiment. For simplicity, elaborations will be omitted herein.

Figure 11:
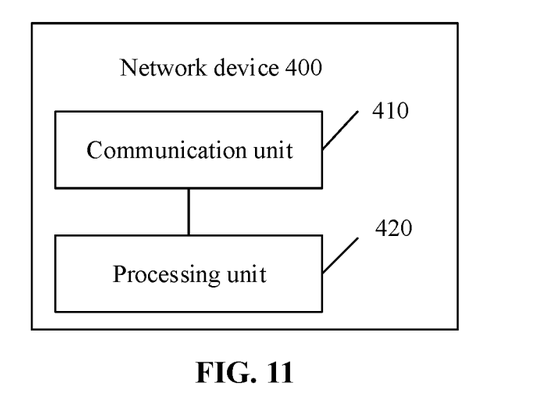
FIG. 11 is a schematic block diagram of a network device according to an embodiment of the application.

FIG. 11 is a schematic block diagram of a network device 400 according to an embodiment of the application. The network device 400 includes a communication unit 410 and a processing unit 420.

The communication unit 410 is configured to send a first message to a terminal, the first message being used to instruct the terminal to stop UL transmission.

The processing unit 420 is configured to stop receiving the UL transmission.

Optionally, the first message is further used to indicate a start point of stopping the UL transmission.

Optionally, the first message indicates the start point by indicating a timing relationship between the message and the start point.

Optionally, the processing unit 420 is further configured to:

determine the start point of stopping the UL transmission according to a timing relationship which is the timing relationship between the first message and the start point.

Optionally, the processing unit 420 is further configured to:

determine an end point of stopping the UL transmission based on a time-domain resource for the UL transmission.

Optionally, the end point of the UL transmission is:

an ending boundary of a first slot for the UL transmission; or, an ending boundary of a first slot after a receiving time of the first message in slots for the UL transmission; or, an ending point of the time-domain resource for the UL transmission; or, an ending boundary of a last slot for the UL transmission.

Optionally, the processing unit 420 is further configured to:

determine the end point of stopping the UL transmission according to at least one of: an effective duration of the first message, a maximum length of stopping the UL transmission, a minimum length of stopping the UL transmission or a stopping duration of present UL transmission.

Optionally, the first message is further used to indicate the end point of stopping the UL transmission.

Optionally, the first message indicates the end point through at least one of:

the effective duration of the first message, the maximum length of stopping the UL transmission, the minimum length of stopping the UL transmission or the stopping duration of the present UL transmission.

Optionally, the communication unit 410 is further configured to:

send a second message that is not the first message to the terminal, the second message indicating at least one of:

the effective duration of the first message, the maximum length of stopping the UL transmission or the minimum length of stopping the UL transmission.

Optionally, the first message indicates the start point and end point of stopping the UL transmission through the same information field.

Optionally, the processing unit 420 is further configured to:

determine that the UL transmission can be stopped, according to a type of the UL transmission, a resource indication type of the UL transmission, a TTI of the UL transmission and/or a type of scheduling signaling for the UL transmission.

Optionally, the communication unit 410 is further configured to:

when the terminal is needed to perform another UL transmission on a resource for the UL transmission or another terminal is needed to perform UL transmission on the resource for the UL transmission, send the first message to the terminal.

It is to be understood that the network device 400 may correspond to the network device in the method 200, may implement corresponding operations of the network device in the method 200 and, for simplicity, will not be elaborated herein.

Figure 12:
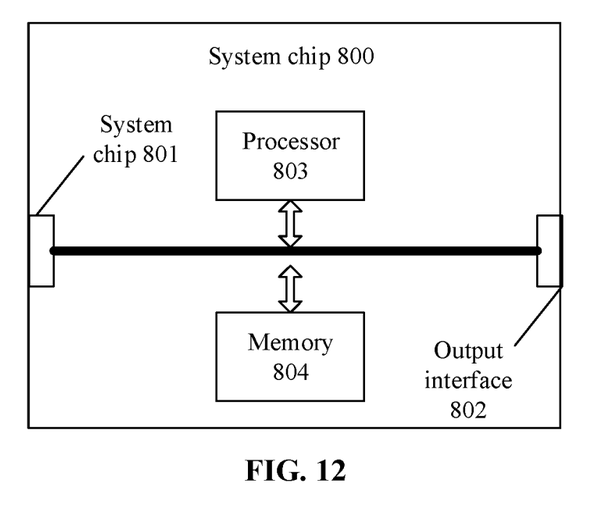
FIG. 12 is a schematic block diagram of a system chip according to an embodiment of the application.

FIG. 12 is a schematic structure diagram of a system chip 800 according to an embodiment of the application. The system chip 800 of FIG. 12 includes an input interface 801, an output interface 802, a processor 803 and a memory 804, which may be connected through an internal communication connecting line. The processor 803 is configured to execute a code in the memory 804.

Optionally, when the code is executed, the processor 803 implements the method executed by the network device in the method embodiment which will not be elaborated herein for simplicity.

Optionally, when the code is executed, the processor 803 implements a method executed by a terminal in the method embodiment, which will not be elaborated herein for simplicity.

Figure 13:
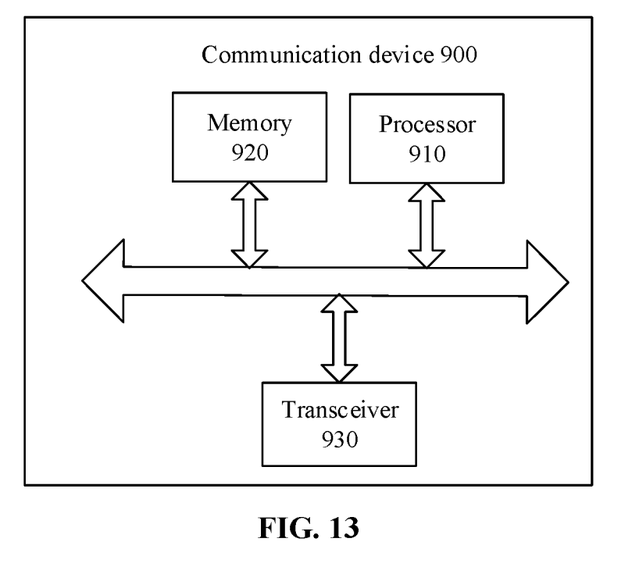
FIG. 13 is a schematic block diagram of a communication device according to an embodiment of the application.

FIG. 13 is a schematic block diagram of a communication device 900 according to an embodiment of the application. As shown in FIG. 13, the communication device 900 includes a processor 910 and a memory 920. Herein, the memory 920 may store a program code, and the processor 910 may execute the program code stored in the memory 920.

Optionally, as shown in FIG. 13, the communication device 900 may include a transceiver 930, and the processor 910 may control the transceiver 930 for external communication.

Optionally, the processor 910 may call the program code stored in the memory 920 to execute corresponding operations of the network device in the method embodiment, which will not be elaborated herein for simplicity.

Optionally, the processor 910 may call the program code stored in the memory 920 to execute corresponding operations of the terminal in the method embodiment, which will not be elaborated herein for simplicity.

It is to be understood that the processor in the embodiment of the application may be an integrated circuit chip and has a signal processing capability. In an implementation process, each step of the method embodiment may be completed by an integrated logical circuit of hardware in the processor or an instruction in a software form. The processor may be a universal processor, a Digital Signal Processor (DSP), an Application Specific Integrated Circuit (ASIC), a Field Programmable Gate Array (FPGA) or another programmable logical device, discrete gate or transistor logical device and discrete hardware component. Each method, step and logical block diagram disclosed in the embodiments of the application may be implemented or executed. The universal processor may be a microprocessor or the processor may also be any conventional processor and the like. The steps of the method disclosed in combination with the embodiments of the application may be directly embodied to be executed and completed by a hardware decoding processor or executed and completed by a combination of hardware and software modules in the decoding processor. The software module may be located in a mature storage medium in this field such as a Random Access Memory (RAM), a flash memory, a Read-Only Memory (ROM), a Programmable ROM (PROM) or Electrically Erasable PROM (EEPROM) and a register. The storage medium is located in a memory, and the processor reads information in the memory, and completes the steps of the methods in combination with hardware.

It can be understood that the memory in the embodiment of the application may be a volatile memory or a nonvolatile memory, or may include both the volatile and nonvolatile memories. The nonvolatile memory may be a ROM, a PROM, an Erasable PROM (EPROM), an EEPROM or a flash memory. The volatile memory may be a RAM, and is used as an external high-speed cache. It is exemplarily but unlimitedly described that RAMs in various forms may be adopted, such as a Static RAM (SRAM), a Dynamic RAM (DRAM), a Synchronous DRAM (SDRAM), a Double Data Rate SDRAM (DDRSDRAM), an Enhanced SDRAM (ESDRAM), a Synchlink DRAM (SLDRAM) and a Direct Rambus RAM (DR RAM). It is to be noted that the memory of a system and method described in the disclosure is intended to include, but not limited to, memories of these and any other proper types.

Those of ordinary skill in the art may realize that the units and algorithm steps of each example described in combination with the embodiments disclosed in the disclosure may be implemented by electronic hardware or a combination of computer software and the electronic hardware. Whether these functions are executed in a hardware or software manner depends on specific applications and design constraints of the technical solutions. Professionals may realize the described functions for each specific application by use of different methods, but such realization shall fall within the scope of the application.

Those skilled in the art may clearly learn about that specific working processes of the system, device and unit described above may refer to the corresponding processes in the method embodiment and will not be elaborated herein for convenient and brief description.

In some embodiments provided by the application, it is to be understood that the disclosed system, device and method may be implemented in another manner. For example, the device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to multiple network units. Part or all of the units may be selected to achieve the purpose of the solutions of the embodiments according to a practical requirement.

In addition, each functional unit in each embodiment of the application may be integrated into a processing unit, each unit may also physically exist independently, and two or more than two units may also be integrated into a unit.

When being realized in form of software functional unit and sold or used as an independent product, the function may also be stored in a computer-readable storage medium. Based on such an understanding, the technical solutions of the application substantially or parts making contributions to the conventional art or part of the technical solutions may be embodied in form of software product, and the computer software product is stored in a storage medium, including a plurality of instructions configured to enable a computer device (which may be a personal computer, a server, a network device or the like) to execute all or part of the steps of the method in each embodiment of the application. The abovementioned storage medium includes: various media capable of storing program codes such as a U disk, a mobile hard disk, a ROM, a RAM, a magnetic disk or an optical disk.

The above is only the specific implementation mode of the application and not intended to limit the scope of protection of the application. Any variations or replacements apparent to those skilled in the art within the technical scope disclosed by the application shall fall within the scope of protection of the application. Therefore, the scope of protection of the application shall be subject to the scope of protection of the claims.

The invention claimed is:

1. A wireless communication method, comprising:
    receiving, by a terminal, a first message, the first message being used to instruct the terminal to stop Uplink (UL) transmission, wherein the UL transmission is one of multiple UL transmissions, and the multiple UL transmissions are classified by service types;
    when the first message is received after a signaling configured for scheduling the UL transmission and a service type corresponding to the UL transmission has a lowest priority, stopping, by the terminal, the UL transmission in response to the first message; and
    not stopping, by the terminal, the UL transmission in response to the first message when the service type corresponding to the UL transmission does not have the lowest priority;
    wherein the first message further contains a time-domain position and a frequency-domain position on which the UL transmission will be stopped.

2. The method of claim 1, wherein the first message is further used to indicate a start point of stopping the UL transmission;
    wherein the method further comprises:
    determining an end point of stopping the UL transmission based on a time-domain resource for the UL transmission, wherein the end point of stopping the UL transmission comprises an ending boundary of a slot, in which the start point of stopping the UL transmission is located, of slots for the UL transmission.

3. The method of claim 2, further comprising:
    determining the start point of stopping the UL transmission according to a timing relationship configured by a high-layer signaling; wherein the timing relationship indicates a timing relationship between the first message and the start point of stopping the UL transmission.

4. The method of claim 1, wherein the UL transmission is one of two types of UL transmissions, a type of transmission being configured for transmitting data and the other type of transmission being configured for transmitting control signaling.

5. The method of claim 1, wherein the first message is Group Common Downlink Control information.

6. The method of claim 2, wherein the first message is further used to indicate a symbol index of the start point from which the UL transmission will be stopped; and
    stopping, by the terminal, the UL transmission in response to the first message comprises:
    stopping, by the terminal, the UL transmission from the symbol index indicated by the first message.

7. The method of claim 1, wherein the service types of the multiple UL transmissions comprise a Ultra Reliable Low Latency Communication (URLLC) service and an Enhance Mobile BroadBand (eMBB) service, and
    wherein a priority of the URLLC service is higher than that of the eMBB service.

8. The method of claim 1, wherein a reason for stopping the UL transmission is unknown to the terminal; and
    the method further comprises:
    determining, by the terminal, a sequence of the priority of the UL transmission in the multiple UL transmissions; and
    determining, by the terminal, whether to stop the UL transmission based on the sequence of the priority of the UL transmission.

9. The method of claim 3, wherein the method further comprises:
    determining, by the terminal, a detection position for the first message based on an UL scheduling condition and the timing relationship;
    performing, by the terminal, detection of the first message at the detection position in response to that the UL transmission is performed; and
    when a value carried in the first message is consistent with a value corresponding to the timing relationship of a corresponding position where the first message is located, determining that the first message instructs the terminal to stop the UL transmission.

10. The method of claim 8, wherein when the priority of the UL transmission is high, the signaling configured for scheduling the UL transmission is in a compressed scheduling signaling format, and a high-density search space is used for transmitting the signaling; and
    when the priority of the UL transmission is low, the signaling configured for scheduling the UL transmission is in a conventional scheduling signaling format, and a low-density search space is used for transmitting the signaling.

11. A terminal, comprising a transceiver and a processor, wherein
    the transceiver is configured to receive a first message, the first message being used to instruct the terminal to stop Uplink (UL) transmission, wherein the UL transmission is one of multiple UL transmissions, and the multiple UL transmissions are classified by service types; and
    the processor is configured to:
    stop the UL transmission in response to the first message when first message is received after a signaling configured for scheduling the UL transmission and a service type corresponding to the UL transmission has a lowest priority, and not stop the UL transmission in response to the first message when the service type corresponding to the UL transmission does not have the lowest priority;
    wherein the first message further contains a time-domain position and a frequency-domain position on which the UL transmission will be stopped.

12. The terminal of claim 11, wherein the first message is further used to indicate a start point of stopping the UL transmission;
    wherein the processor is further configured to:
    determine an end point of stopping the UL transmission based on a time-domain resource for the UL transmission, wherein the end point of stopping the UL transmission comprises an ending boundary of a slot, in which the start point of stopping the UL transmission is located, of slots for the UL transmission.

13. The terminal of claim 12, wherein the processor is further configured to:
    determine the start point of stopping the UL transmission according to a timing relationship configured by a high-layer signaling.

14. The terminal of claim 11, wherein the UL transmission is one of two types of UL transmissions, and a type of transmission is configured for transmitting data and the other type of transmission is configured for transmitting control signaling.

15. The terminal of claim 11, wherein the first message is Group Common Downlink Control information.

16. The terminal of claim 12, wherein the first message is further used to indicate a symbol index of the start point from which the UL transmission will be stopped; and
stopping the UL transmission in response to the first message comprises:
stopping the UL transmission from the symbol index indicated by the first message.

17. The terminal of claim 11, wherein the service types of the multiple UL transmissions comprise a Ultra Reliable Low Latency Communication (URLLC) service and an Enhance Mobile BroadBand (eMBB) service, and
wherein a priority of the URLLC service is higher than that of the eMBB service.

18. A network device, comprising: a transceiver and a processor, wherein
the transceiver is configured to send a first message, the first message being used to instruct a terminal to stop or not stop Uplink (UL) transmission based on a priority of the UL transmission, wherein the UL transmission is one of multiple UL transmissions, and the multiple UL transmissions are classified by service types; and
the processor is configured to:
determine whether to stop the UL transmission or not based on the priority of the UL transmission, and stop receiving the UL transmission when the priority of the UL transmission is lowest in multiple UL transmissions;
wherein the first message further contains a time-domain position and a frequency-domain position on which the UL transmission will be stopped.

19. The network device of claim 18, wherein the first message is further used to indicate a start point of stopping the UL transmission; and
the first message is further used to instruct the terminal to determine an end point of stopping the UL transmission based on a time-domain resource for the UL transmission, wherein the end point of stopping the UL transmission comprises an ending boundary of a slot, in which the start point of stopping the UL transmission is located, of slots for the UL transmission.

20. The network device of claim 18, wherein the UL transmission is one of two types of UL transmissions, and a type of transmission is configured for transmitting data and the other type of transmission is configured for transmitting control signaling; and
wherein the first message is Group Common Downlink Control information.

* * * * *